(12) United States Patent
Chaala et al.

(10) Patent No.: US 8,475,880 B2
(45) Date of Patent: Jul. 2, 2013

(54) PROCESS AND APPARATUS FOR THE HEAT TREATMENT OF A WOOD PRODUCT AND TREATED WOOD PRODUCT

(75) Inventors: Abdelkader Chaala, Quebec (CA); Ahmed Koubaa, Rouyn-Noranda (CA)

(73) Assignees: Serex, Amqui (CA); Valuqat S.E.C., Montreal (CA)

( * ) Notice: Subject to any disclaimer, the term of this patent is extended or adjusted under 35 U.S.C. 154(b) by 753 days.

(21) Appl. No.: 12/522,088

(22) PCT Filed: Jan. 3, 2008

(86) PCT No.: PCT/CA2008/000002
§ 371 (c)(1),
(2), (4) Date: Jan. 4, 2010

(87) PCT Pub. No.: WO2008/083462
PCT Pub. Date: Jul. 17, 2008

(65) Prior Publication Data
US 2010/0143737 A1   Jun. 10, 2010

Related U.S. Application Data

(60) Provisional application No. 60/883,280, filed on Jan. 3, 2007.

(51) Int. Cl.
*B32B 21/04* (2006.01)

(52) U.S. Cl.
USPC .......... 427/393; 427/397; 427/440; 428/537.1

(58) Field of Classification Search
USPC .................. 427/393, 397, 440; 428/537.1
See application file for complete search history.

(56) References Cited

FOREIGN PATENT DOCUMENTS

| | | | |
|---|---|---|---|
| CA | 2347533 | * | 4/2000 |
| CA | 2347533 A1 | | 4/2000 |
| FR | 2870773 | * | 12/2005 |
| FR | 2870773 A1 | | 12/2005 |
| SE | 9701930 | * | 5/1997 |
| SE | 9701930 A | | 5/1997 |
| WO | 9219429 | * | 11/1992 |
| WO | 9219429 A1 | | 11/1992 |

* cited by examiner

*Primary Examiner* — Leszek Kiliman
(74) *Attorney, Agent, or Firm* — Goudreau Gage Dubuc; Hugh Mansfield

(57) ABSTRACT

A process and apparatus for treatment of wood, typically moist wood, using a heated bioester derived from vegetable oil or animal fat. The bioester exhibits a decreased viscosity versus other methods of heated oil treatment thereby providing for deep penetration of the heated bioester into the wood.

22 Claims, 11 Drawing Sheets

Physical and thermal properties of vegetable oils and bioesters prepared from vegetable oils[1,2]

| Oil / Biodiesel | Kinematic viscosity* | Cetane no. | Heating value (MJ/kg) | Cloud point (°C) | Pour point (°C) | Flash point (°C) | Density (g/cm₃) | Carbon residue (wt%) | Ash (wt%) | Sulfur (wt%) |
|---|---|---|---|---|---|---|---|---|---|---|
| Vegetable oil | | | | | | | | | | |
| Corn | 34.9 | 37.60 | 39.50 | -1.1 | -40.0 | 277 | 0.9095 | 0.24 | 0.010 | 0.01 |
| Cottonseed | 33.5 | 41.8 | 39.5 | 1.7 | -15.0 | 234 | 0.9148 | 0.24 | 0.010 | 0.01 |
| Crambe | 53.6 | 44.6 | 40.5 | 10.0 | -12.2 | 274 | 0.9044 | 0.23 | 0.050 | 0.01 |
| Linseed | 22.2 | 34.6 | 39.3 | 1.7 | -15.0 | 241 | 0.9236 | 0.22 | <0.01 | 0.01 |
| Peanut | 39.6 | 41.8 | 49.8 | 12.8 | -6.7 | 271 | 0.9026 | 0.24 | 0.005 | 0.01 |
| Rapeseed | 37.0 | 37.6 | 39.7 | -3.9 | -31.7 | 246 | 0.9115 | 0.30 | 0.054 | 0.01 |
| Safflower | 31.3 | 41.3 | 39.5 | 18.3 | -6.7 | 260 | 0.9144 | 0.25 | 0.006 | 0.01 |
| HO Safflower | 41.2 | 49.1 | 39.5 | -12.2 | -20.6 | 293 | 0.9021 | 0.24 | <0.001 | 0.02 |
| Sesame | 35.5 | 40.2 | 39.3 | -3.9 | -9.4 | 260 | 0.9133 | 0.25 | <0.01 | 0.01 |
| Soyabean | 32.6 | 37.9 | 39.6 | -3.9 | -12.2 | 254 | 0.9138 | 0.27 | <0.01 | 0.01 |
| Sunflower | 33.9 | 37.1 | 39.6 | 7.2 | -15.0 | 274 | 0.9161 | 0.23 | <0.01 | 0.01 |
| Palm | 39.6 | 42.0 | - | 31.0 | - | 267 | 0.9180 | - | - | - |
| Babassu | 30.3 | 38.0 | - | 20.0 | - | 150 | 0.9460 | - | - | - |
| Tallow | - | - | 40.0 | - | - | 201 | - | 6.21 | - | - |
| Bioesters (vegetable oil methyl ester) | | | | | | | | | | |
| Peanut | 4.9 | 54 | 33.6 | 5 | - | 176 | 0.883 | - | - | - |
| Soyabean | 4.5 | 45 | 33.5 | 1 | -7 | 178 | 0.885 | 1.74 | - | - |
| Palm | 5.7 | 62 | 33.5 | 13 | - | 164 | 0.88 | - | - | - |
| Sunflower | 4.6 | 49 | 33.5 | 1 | - | 183 | 0.86 | - | - | - |
| Linseed | 3.59 | 52 | 35.3 | - | -15 | 176 | 0.874 | 1.83 | - | - |
| Tallow | - | - | - | 12 | 9 | 96 | - | - | - | - |

* at 40°C

1. Srivastava A, Prasad R., "Triglycerides-based diesel fuels" (2000) 4 Renew Sustain Energy Review 4:111-33.
2. Avinash Kumar Agarwal, "Biofuels (alcohols and biodiesel) applications as fuels for internal combustion engines" (2007) 33 Progress in Energy and Combustion Science 233.

Figure 2

Summary of mould growth on test samples (8 weeks at 25°C & RH 100%)

| Wood species | Treatment | Testing time (week) | Mould growth rating scale (0-5) | | | Mold growth Reduction (%) |
|---|---|---|---|---|---|---|
| | | | Face | Edge | Average | |
| Balsam Fir | Control | 2 | 0.00 | 0.00 | 0.00 | 0 |
| | | 4 | 0.00 | 0.00 | 0.00 | 0 |
| | | 6 | 0.83 | 1.00 | 0.89 | 0 |
| | | 8 | 1.50 | 2.00 | 1.67 | 0 |
| | 180°C/30 min | 2 | 0.00 | 0.00 | 0.00 | 0 |
| | | 4 | 0.00 | 0.00 | 0.00 | 0 |
| | | 6 | 0.00 | 0.00 | 0.00 | 100 |
| | | 8 | 0.00 | 0.00 | 0.00 | 100 |
| | 200°C/30 min | 2 | 0.00 | 0.00 | 0.00 | 0 |
| | | 4 | 0.00 | 0.00 | 0.00 | 0 |
| | | 6 | 0.00 | 0.00 | 0.00 | 100 |
| | | 8 | 0.33 | 0.00 | 0.22 | 87 |
| Larch | Control | 2 | 1.17 | 1.33 | 1.22 | 0 |
| | | 4 | 1.83 | 3.00 | 2.22 | 0 |
| | | 6 | 4.17 | 4.00 | 4.11 | 0 |
| | | 8 | 4.83 | 4.33 | 4.67 | 0 |
| | 180°C/30 min | 2 | 0.00 | 0.00 | 0.00 | 100 |
| | | 4 | 0.33 | 1.00 | 0.56 | 75 |
| | | 6 | 0.33 | 1.00 | 0.56 | 86 |
| | | 8 | 0.50 | 1.00 | 0.67 | 86 |
| | 200°C/30 min | 2 | 0.00 | 0.00 | 0.00 | 100 |
| | | 4 | 0.33 | 1.00 | 0.56 | 75 |
| | | 6 | 0.50 | 1.00 | 0.67 | 84 |
| | | 8 | 0.67 | 1.00 | 0.78 | 83 |
| Poplar | Control | 2 | 0.00 | 0.00 | 0.00 | 0 |
| | | 4 | 1.50 | 1.33 | 1.44 | 0 |
| | | 6 | 3.50 | 3.00 | 3.33 | 0 |
| | | 8 | 3.67 | 3.33 | 3.56 | 0 |
| | 180°C/30 min | 2 | 0.00 | 0.00 | 0.00 | 0 |
| | | 4 | 0.00 | 0.00 | 0.00 | 100 |
| | | 6 | 0.17 | 0.00 | 0.11 | 97 |
| | | 8 | 0.17 | 0.33 | 0.22 | 94 |
| | 200°C/30 min | 2 | 0.00 | 0.00 | 0.00 | 0 |
| | | 4 | 0.33 | 1.00 | 0.56 | 61 |
| | | 6 | 0.33 | 1.00 | 0.56 | 83 |
| | | 8 | 0.33 | 1.00 | 0.56 | 84 |

Figure 9

Note: Mold growth scale: 0 = no mold growth; 1 = mold growth on less than 5% of sample surface area; 2 = mold growth on 5-25% of sample surface area; 3 = mold growth on 25-50% of sample surface area; 4 = mold growth on 50-75% of sample surface area; and 5 = mold growth on more than 75% of sample surface area.

PROCESS AND APPARATUS FOR THE HEAT TREATMENT OF A WOOD PRODUCT AND TREATED WOOD PRODUCT

CROSS-REFERENCE TO RELATED APPLICATIONS

This application is a National Entry Application of PCT application no PCT/CA2008/000002 filed on Jan. 3, 2008 and published in English under PCT Article 21(2), which itself claims priority on U.S. provisional application Ser. No. 60/883,280, filed on Jan. 3, 2007. All documents above are incorporated herein in their entirety by reference.

FIELD OF THE INVENTION

The present invention relates to a process and apparatus for the heat treatment of a wood product and the treated wood product. In particular, the present invention relates the to the heat treatment of green and high level moisture content woods with bioesters derived from used frying oils, animal fats and the like in order to increase their hydrophobic character, their durability, their dimensional stability and their resistance to attack by micro-organisms.

BACKGROUND TO THE INVENTION

Heat treatment of wood is known in the art to improve dimensional stability and resistance against mould and decay. The effect of heat treatments on decay resistance of wood has also been studied by several researchers and it is well known that heat treatment increased the resistance of wood to decay, rot and fungi (see, for example, Kamdem et al., "Durability of heated treated wood" (2002) 60 Holz als Roh- und Werkstoff 1 and Hakkou, et al. "Investigations of the reasons for fungal durability of heat treated beach wood" (2006) 91 Polymer Degradation and Stability 393). Improvement of decay, rot and fungi resistance is especially notable when wood is treated at temperatures in excess of 180° C. The durability and decay resistance increases with treatment temperature and is reported to be complete when treatment is performed at 280° C. Several reports in the literature agree that chemical modification is the most plausible hypothesis to explain improvement in durability through thermal treatment.

The prior art discloses several processes for the thermal treatment of wood using different heating vectors including air, oil or liquid solutions. For example, U.S. Pat. No. 5,678,324 discloses a heat treatment process where the wet cellulosic product is dried in an initial step to 15% moisture content then subject to a temperature typically from 180° C. to 250° C. for 2 to 8 hours. Finish Patent No. 68,122 discloses a process for treating wood products at temperatures of 160° C. to 240° C. and pressures of 3 to 15 bar whereby the capacity of wood to absorb water is reduced considerably thereby improving dimensional stability.

German Patent No. DE 3043659A1 discloses a process which consists of immersing wood in an oil bath at temperatures of 130° C. to 140° C. This process is reputed to improve dimensional stability and durability. The improvement of durability is thought to be accomplished through a preliminary treatment with biocides.

U.S. Pat. No. 5,451,361 discloses a heat treatment process which produces high value products from low quality wood. This process consists of applying different stages of thermal treatment where the first stage is a softening stage where the wood is heated in the presence of an aqueous medium and at equilibrium pressure of operating temperature, to a temperature in the range of from about 120° C. to about 160° C. The second step consists heating the wood to a temperature in the range of from about 160° C. to about 240° C. for not more than 1 hour followed by dewatering and curing stages. In this process, the differential between core and surface temperature is used to pass from one stage to another. This process is time consuming as each step lasts for several hours.

The use of heating to reduce oil viscosity thereby facilitating wood treatment is discussed in German Patent No. DE4112643. Heating improves wood impregnation by the treating oils but only permeable species may be treated using this process.

U.S. Pat. No. 6,217,939 describes a wood treatment process using linseed or rape (canola) oil. The process described therein consists of treating lignocellulosic materials for several hours in liquid bath of oil with the exclusion of oxygen and is carried out at temperatures ranging from 180° C. to 260° C. for several hours. The improvement in the dimensional stability and resistance against wood-destroying organisms is reported as being due to the alteration of the lignocellulosic material by thermal action.

The available thermal processes using conventional heating vectors such as air, steam and oil are time consuming and need generally to be applied in an oxygen rare atmosphere under pressure, thereby requiring a closed reactor vessel. These processes are generally very expensive and energy consuming and as a result are typically not accessible for smaller businesses and wood producers such as pallet and furniture manufacturers.

SUMMARY OF THE INVENTION

In order to address the above and other drawbacks there is provided a process for the heat treatment of a wood product. The process comprises placing the wood product in a reactor vessel, heating a bioester to a predetermined temperature, introducing the bioester into the reactor vessel until the wood product is covered with the bioester, retaining the covered wood product in the reactor vessel for a predetermined period of time, and removing the treated wood product from the reactor vessel.

There is also disclosed a mould and decay resistant wood product treated with a heated bioester.

There is additionally disclosed a heat treated wood product that complies with north American regulations with regard to phytosanitary treatments of wooden pallets and packaging material.

Furthermore, there is disclosed and described an apparatus for treating a wood product. The apparatus comprises a reactor vessel containing a bioester heated to a predetermined temperature, the vessel configured to receive the wood product. The wood product is placed in the vessel and covered by the heated bioester for a predetermined period of time.

Additionally, there is disclosed a process for the treatment of a wood product. The process comprises placing the wood product in a vessel, heating a treatment product having a kinematic viscosity of less than 20 at 40° C. to a predetermined temperature, introducing the treatment product into the vessel until the wood product is covered with the treatment product, and removing the treated wood product from the vessel. The treatment product is derived from a vegetable oil.

The use of bioesters leads to a reduction of treating time, depending on the sample dimensions. This represents a huge economical advantage in terms of energy consumption. This allows also treating high volumes of a green wood over shorter period of time. Although some esters contained in the bioesters have been tested as a wood preservative, the high temperature increases the preservative effect of the bioesters by increasing the depth of penetration and enhances the dimensional stability of the wood by reducing the hydroxide groups.

As the disclosed process in particular embodiments can use bioesters derived from recycled products, the proposed process is environmentally friendly.

BRIEF DESCRIPTION OF THE DRAWINGS

FIG. 2 provides a table of the physical and thermal properties of a variety of common vegetable oils and bioesthers;

FIG. 9 provides a table of the mould growth on test samples;

DETAILED DESCRIPTION OF THE ILLUSTRATIVE EMBODIMENTS

Figure 1:
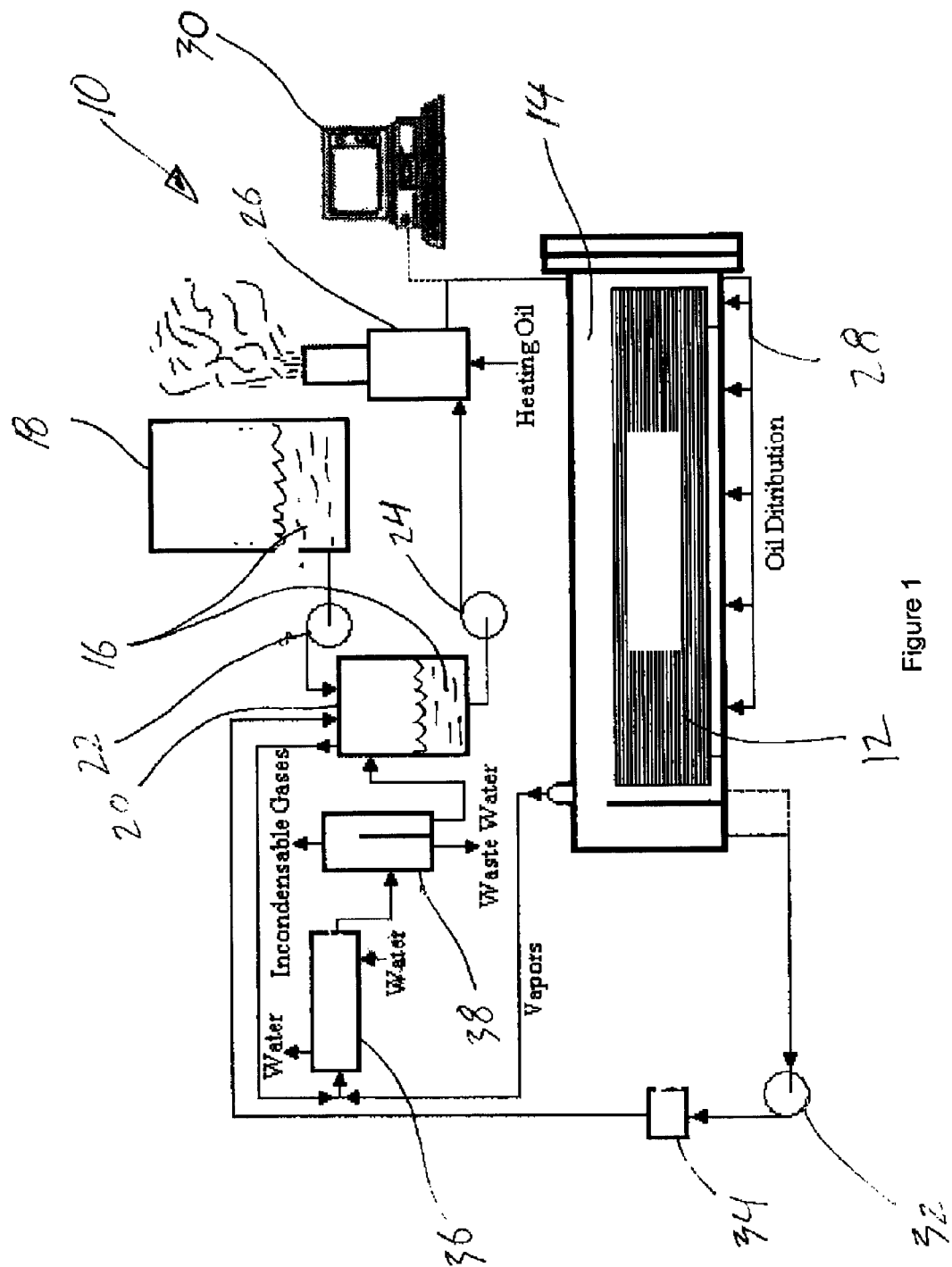
FIG. 1 provides a schematic diagram of a process for the heat treatment of wood with bioesters according to an illustrative embodiment of the present invention.
Figure 3:
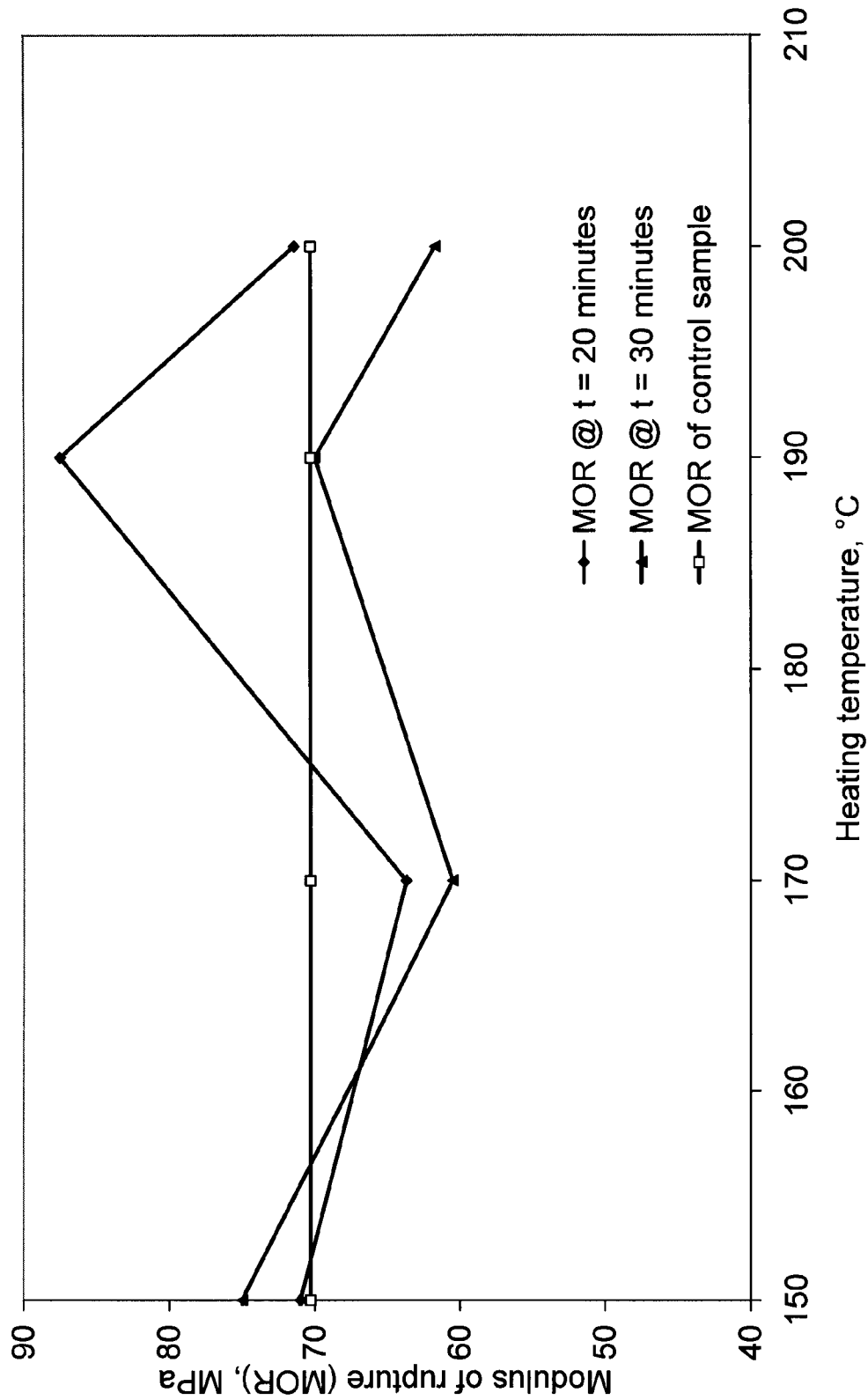
FIG. 3 provides a graph of the variation of MOR with treatment temperature and residence time (heating vector: bioesters)
Figure 4:
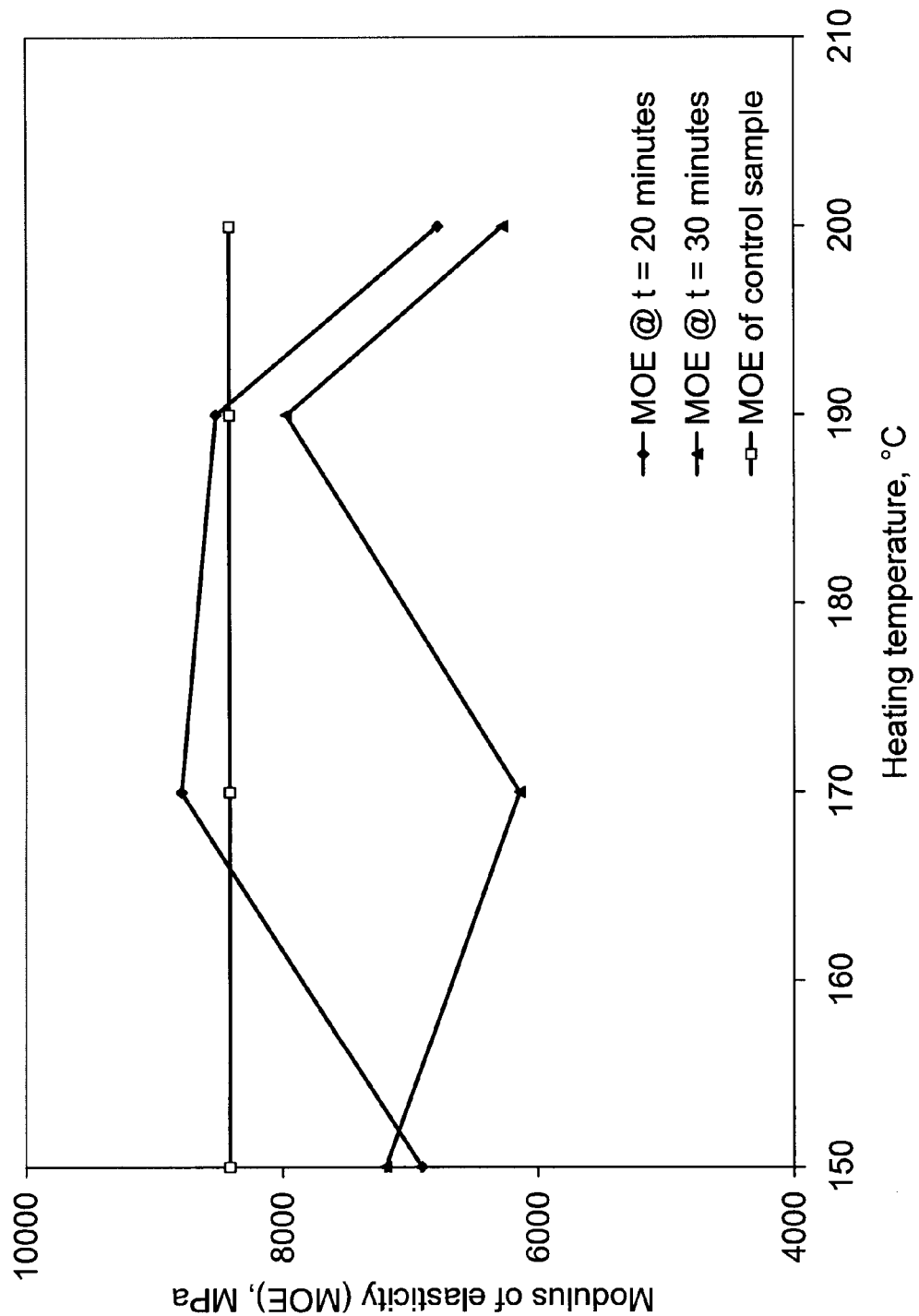
FIG. 4 provides a graph of the variation in MOE with treatment temperature and residence time (heating vector: bioesters)
Figure 5:
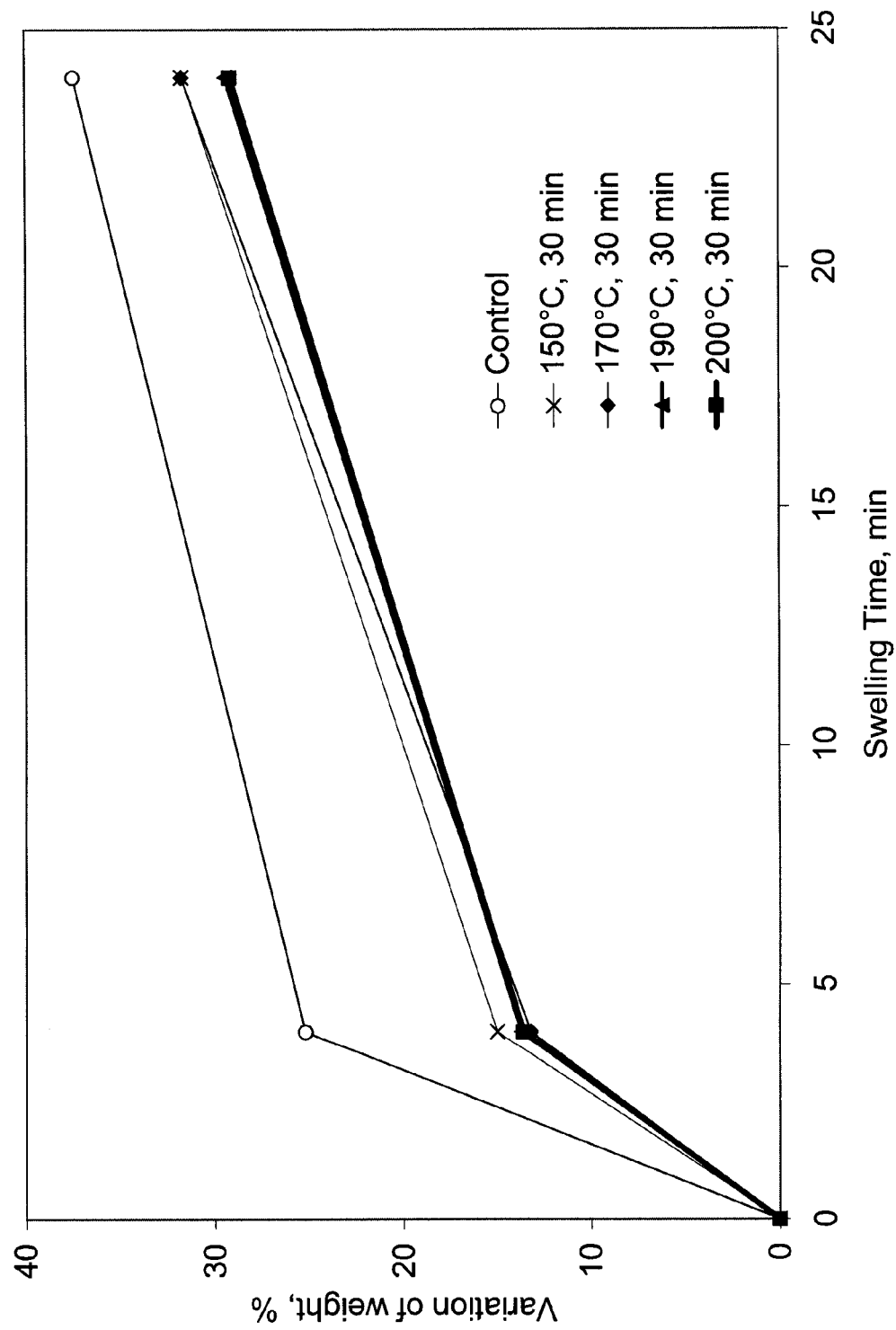
FIG. 5 provides a graph of the swelling properties of the non treated and heat treated fir wood samples with bioesters (variation of weight)
Figure 6:
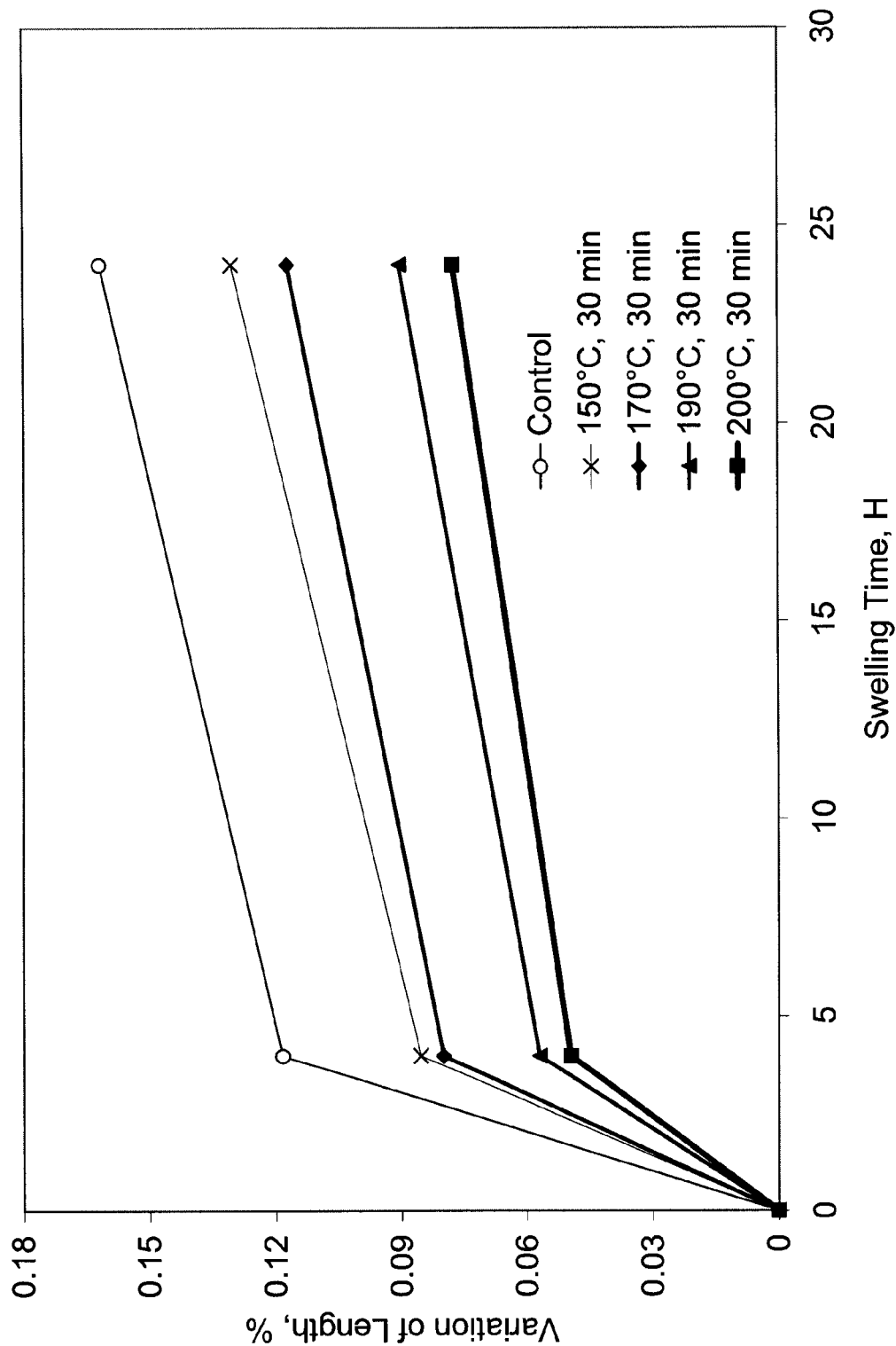
FIG. 6 provides a graph of the swelling properties of the non treated and heat treated fir wood samples with bioesters (variation of length)
Figure 7:
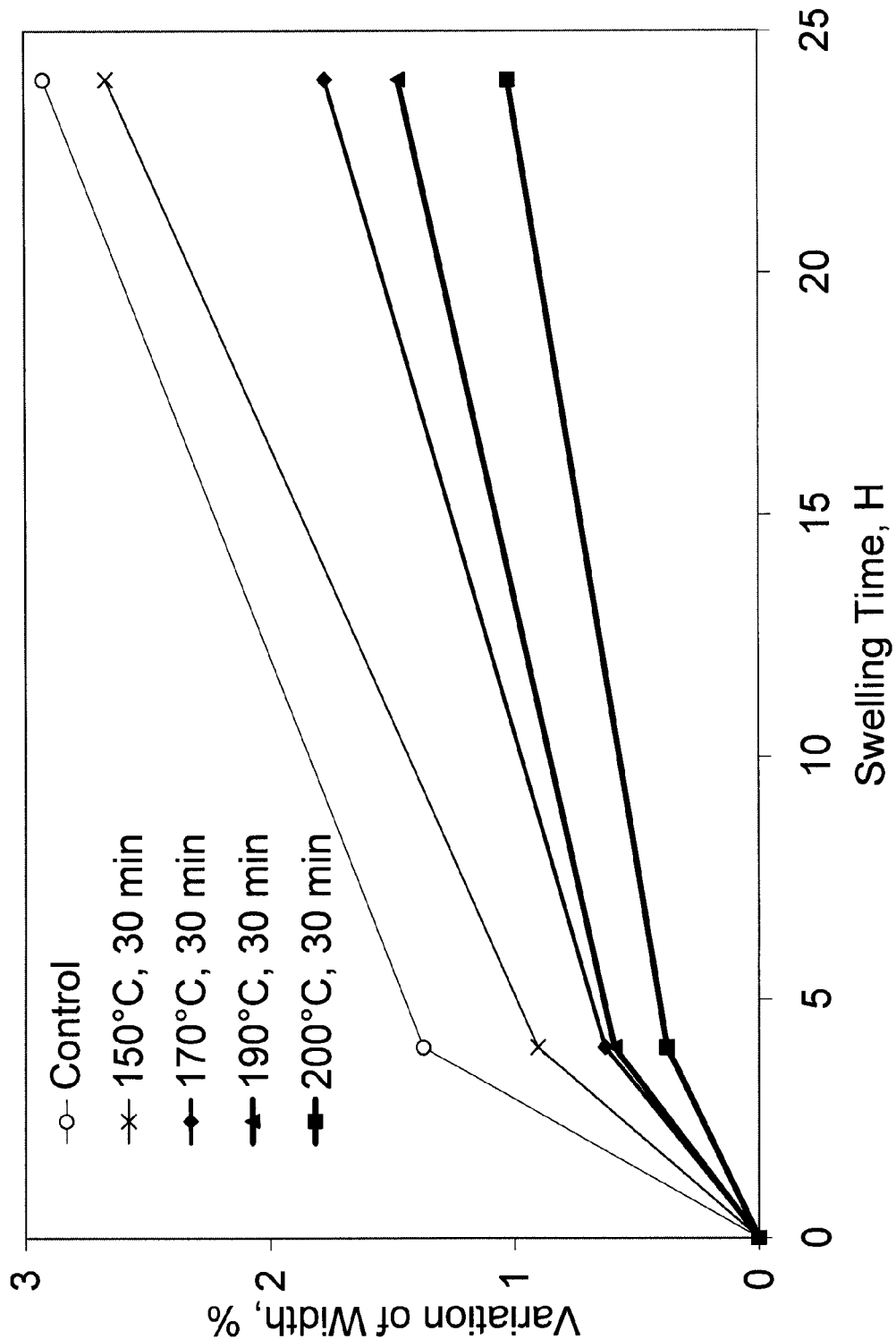
FIG. 7 provides a graph of the swelling properties of the non treated and heat treated fir wood samples with bioesters (variation of width)
Figure 8:
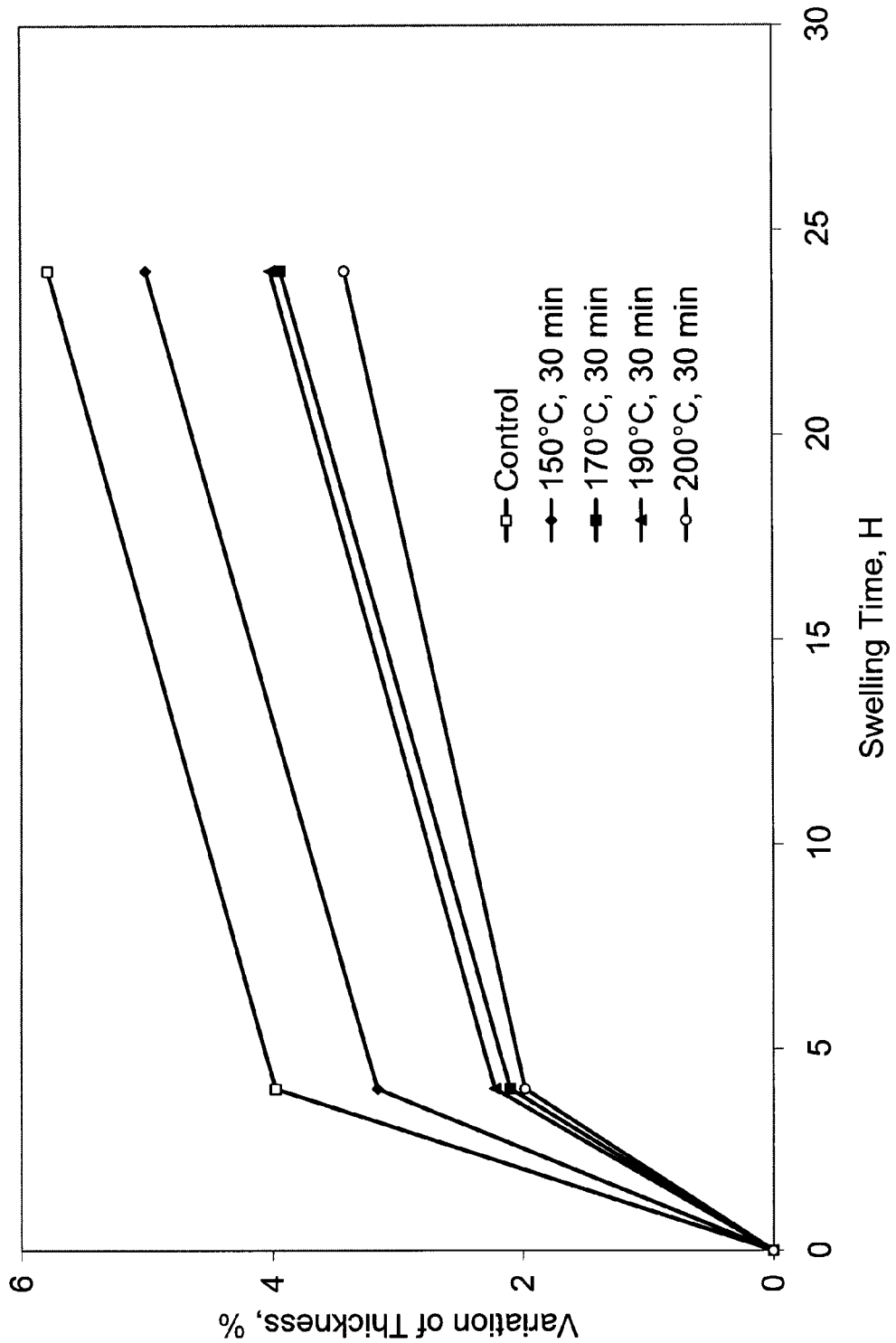
FIG. 8 provides a graph of the swelling properties of the non treated and heat treated fir wood samples with bioesters (variation of thickness)

Referring now to FIG. 1, a process for the heat treatment of wood, generally referred to using the reference numeral 10, will be described. The wood 12, illustratively green or other wood having a high moisture content, to be subject to the heat treatment is placed within a reactor vessel (or bath) 14. A portion of the bioesters 16, which are maintained in a main tank 18, is transferred to a daily tank 20 using a transfer pump 22. A feeding pump 24 in turn feeds the bioesters 16 from the daily tank 20 to a furnace 26 where the bioesters 16 are heated to a predetermined temperature, illustratively using heating oil or the like. The heated bioesters 12 are then fed via a network of pipes 28 and under control of a computer 30 into the reactor 14.

Still referring to FIG. 1, residual bioesters 16 are captured at the bottom of the reactor 14 and transferred back to the daily tank 20 via a hot oil pump 32 and filter 34, which removes any debris or other impurities (not shown) which may have been introduced into the hot bioesters 16 by the wood 12. Additionally, the vapours formed during the heat treatment are composed of volatile products generated by evaporation and degradation of the heating fluid, by evaporation of water and extracts contained within the wood, and by chemical transformation of cellulose, hemicelluloses and lignin compounds. The vapours are fed into a condenser 36 (illustratively fed with an appropriate cooling liquid such as water) along with vapours which may have been given off by the bioesters 16 held in the daily tank 20. The condensed vapour is subsequently fed into a separator 38 where it is separated into an organic phase, aqueous phase and incondensable gases. The organic phase is forwarded to the daily tank 20 and the aqueous phase is stored in an appropriate vessel. The actual subsequent treatment of the aqueous phase and incondensable gases depends on the results of their analysis. Typically, the incondensable gases can be burned.

During operation, the wood 12 to be subject to heat treatment is hermetically sealed within the reactor 14. When the heat treatment is completed, the reactor 14 is purged of the heating fluid and the wood removed and stored in a ventilated area.

A variety of bioesters 16 were tested to determine their impact on the heat treatment process. The bioesters 16 were derived from used frying oils and animal fats through known esterification processes. TABLE 1 provides illustrative values/characteristics of one of these bioesters 16.

TABLE 1

Properties of bioesters

| Property | Value | Property | Value |
|---|---|---|---|
| Density, $kg/m^3$ | 895 | Boiling Point, ° C.: | |
| Kinematic Viscosity @ 40° C., cSt | 5.5 | IBP | 297 |
| Flash point, ° C. | 170 | T 50% | 357 |
| Pour point, ° C. | 1.3 | T 97% | 451 |
| Carbon Conradson Residue, wt. % | 0.080 | Total glycerine content, wt. % | 0.23 |
| Sulphur content, ppm | 9.1 | Water and sediment, vol. % | 0.4 |

Additional properties for a variety of vegetable oils and bioesters can be found in the table at FIG. 2.

Still referring to FIG. 1, a variety of 2×4 lumber derived from different moist woods such as Fir, Larch and Poplar were subject to the above illustrated process and the temperature profiles of the bioesters in the reactor and the wood core recorded. Additionally, impregnation time was determined from the time when the pieces have been immersed in the hot bioesters 16 within the reactor 14. After impregnation, the treated wood was removed from the reactor 14 and wrapped in absorbing paper to remove any residual oil (although in large scale operations this operation will likely not be necessary), then weighed and analysed. The bioesters 16 recuperated via the hot oil pump 32 and filter 34 were filtered and reused more than ten (10) times without visually any change in flow properties.

Subsequent analysis has indicated that the conditions of treatment that confer improvements and acceptable mechanical properties for the wood studied samples are temperature in the range of about 180° C. to about 190° C. and a treatment time of about 30 minutes. Of note is that as temperatures were increased to about 200° C., the wood 12 typically becomes discoloured and its mechanical properties decrease, although the durability and the hydrophobicity in terms of dimensional stability and moisture content increase. On the other hand, as temperatures are reduced to below 150° C., the wood absorbs a large amount of oil. The quantity of water remained into the wood cells which influences the moisture content is important.

This treatment led also to wood drying to a level of moisture content lower than 8%. The wood thus dried is free of major defects and checks. The final moisture content depends on treatment temperature and time. High temperatures led to final moisture content of about 0%.

Some examples of the effect the heat treatment has on the quality of wood are presented in FIG. 3 to FIG. 8.

Figure 10:
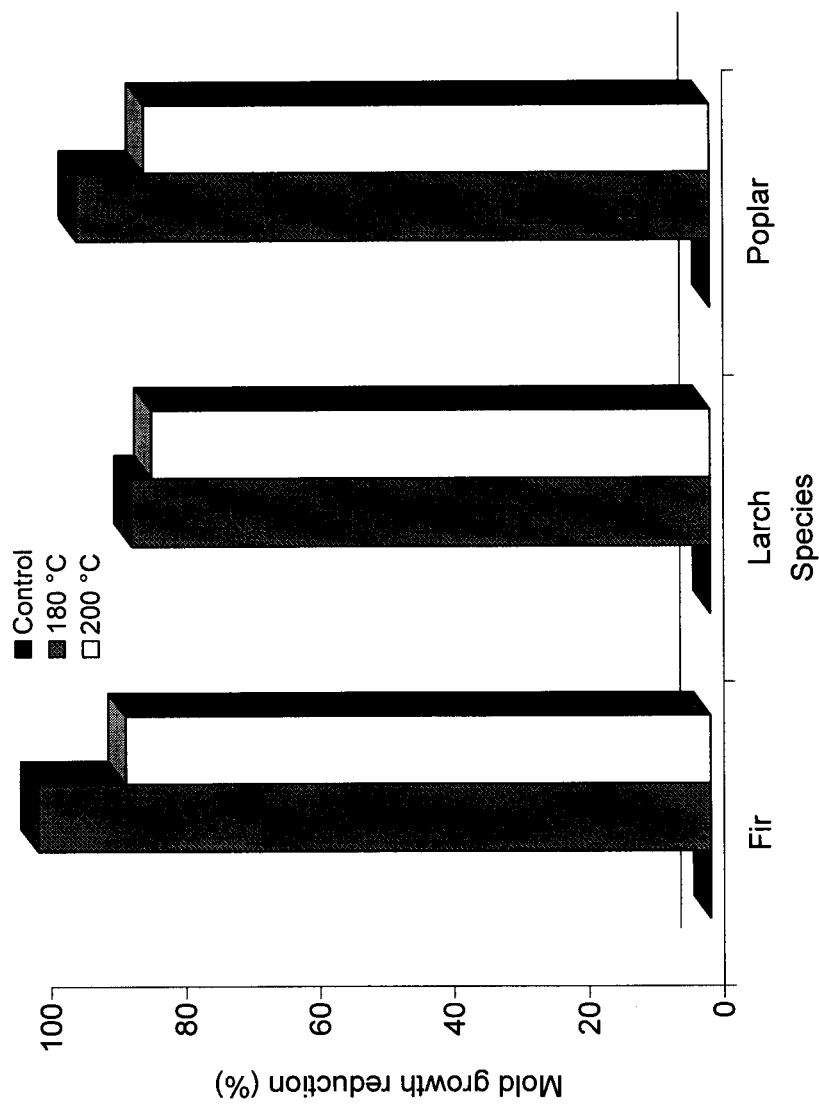
FIG. 10 provides a graph of mould growth reduction after 8 weeks exposure on wood samples from three species (fir, larch and poplar) treated with bioesters for 30 minutes at 180° C. and at 200° C.

Referring to FIGS. 9 and 10, the treatment reduced mould infection after 8 weeks of exposure for three wood species by more than 80%. Good results were obtained for samples treated at 180° C. for 30 minutes. Effects of heat treatment on reduction of mould infection are tabled in FIG. 9 and charted in FIG. 10.

Figure 11:
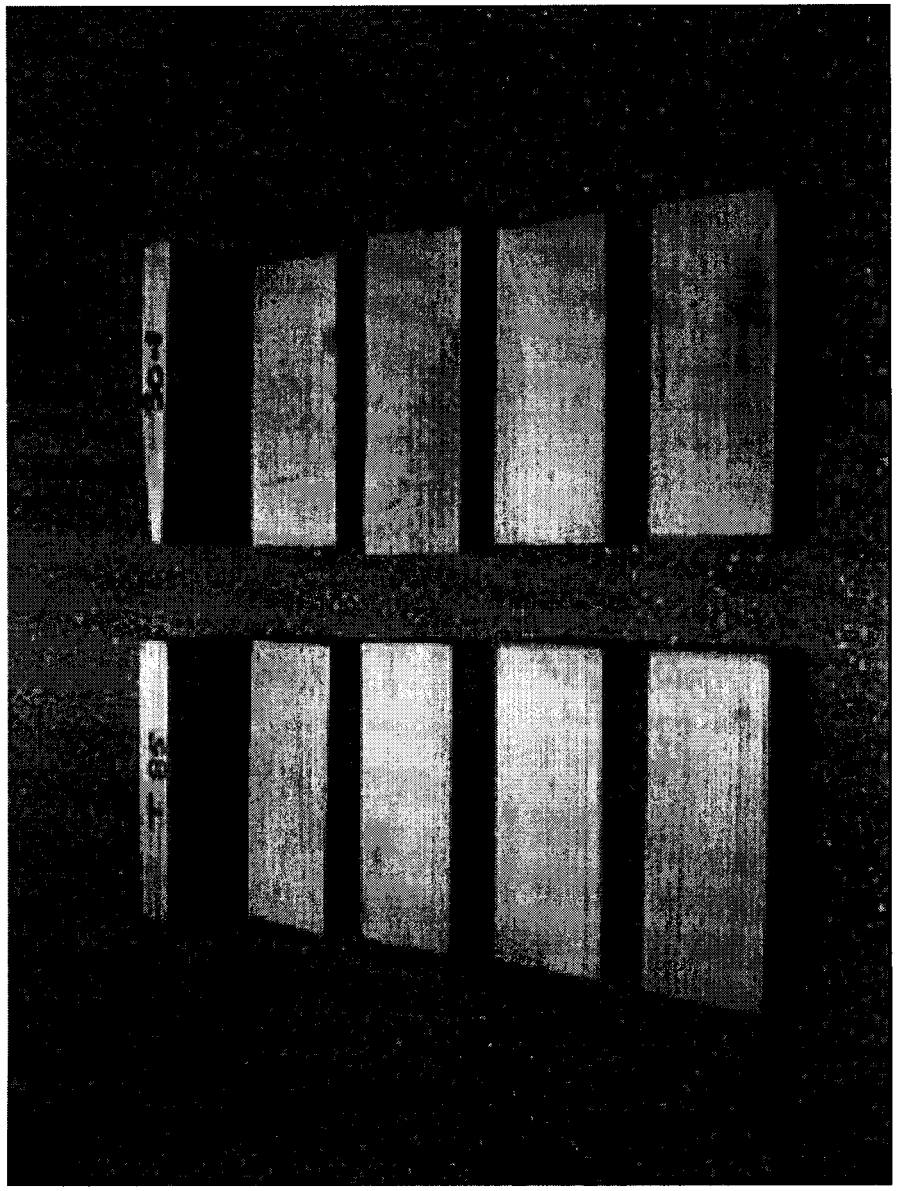
FIG. 11 provides a photo of aged wood samples untreated and treated fir with bioesters at 180° C. and 30 minutes.

Referring to FIG. 11, the treatment also improved the aging behaviour of wood. After 8 months of exposures to extreme weather conditions, untreated wood color changed to grey while color of treated wood did not change.

The treated wood derived from application of the above described process is suitable for a variety of common applications where resistance to mould and decay is required, such as general construction, manufacture of outdoor furniture, manufacture of frames for external doors and windows, manufacture of decks, manufacture of siding, and the manufacture of pallets and packaging materials. Additionally, the process can be used to treat wood such that it complies with the North American regulations with regard to the phytosanitary heat treatment of pallet and packaging materials.

Although the present invention has been described hereinabove by way of an illustrative embodiment thereof, this embodiment can be modified at will, within the scope of the present invention, without departing from the spirit and nature of the subject of the present invention.

What is claimed is:

1. A process for the heat treatment of a wood product, the process comprising:
   placing the wood product in a reactor vessel;
   heating bioesters in a heater to a predetermined temperature;
   introducing said bioesters into said reactor vessel until the wood product is covered with said bioesters;
   retaining the covered wood product in said reactor vessel for a predetermined period of time;
   removing the treated wood product from said reactor vessel; and
   recovering substantially all of said bioesters from the treated wood product;
   wherein said bioesters act as a heating medium and said bioesters may be used a plurality of times as said heating medium without additional processing.

2. The process of claim 1, wherein said bioesters are contained in a biodiesel, wherein said bioesters are heated by heating said biodiesel and further wherein said bioesters are introduced into said reactor vessel by introducing said biodiesel into said reactor vessel.

3. The process of claim 1, wherein said predetermined period of time is between about 20 minutes and about 30 minutes.

4. The process of claim 1, wherein said predetermined temperature is between about 150° C. and about 230° C.

5. The process of claim 4, wherein said predetermined temperature is between 180° C. and 190° C.

6. The process of claim 1, wherein the wood product is 2×4 lumber, said predetermined period of time is between about 20 minutes and about 30 minutes and said predetermined temperature is between 18O ° C. and 190° C.

7. The process of claim 1, wherein said covered wood product is retained in said reactor vessel at atmospheric pressure.

8. The process of claim 1, wherein said heated bioesters circulate between said reactor vessel and said heater, maintaining said wood product at said predetermined temperature.

9. The process of claim 1, wherein said bioesters are maintained at said predetermined temperature for said predetermined period of time.

10. The process of claim 1, wherein said reactor vessel is hermetically sealed.

11. The process of claim 1, wherein the wood product comprises a green wood.

12. The process of claim 1, wherein the wood product is comprises a wood lumber having a predetermined length, width and thickness and further wherein said reactor vessel is configured to receive the wood lumber.

13. The process of claim 1, wherein said bioesters are derived using esterification of a substance selected from the group consisting of vegetable oil, animal fat and combinations thereof.

14. The process of claim 13, wherein said vegetable oil is selected from the group consisting of corn oil, cottonseed oil, cramble oil, linseed oil, peanut oil, rapeseed oil, canola oil, safflower oil, HO safflower oil, sesame oil, soyabean oil, sunflower oil, palm oil, babassu oil and combinations thereof.

15. The process of claim 1, wherein said heated bioesters are recovered from said vessel prior to removing the treated wood product from said vessel.

16. The process of claim 1, further comprising storing said treated wood product in a ventilated area.

17. The process of claim 1, wherein the wood product is lumber selected from the group consisting of fir, larch, maple, cherry, spruce, oak, aspen and poplar.

18. An apparatus for heat treating a wood product comprising:
   a reactor vessel configured to receive the wood product;
   a source of bioesters heated to a predetermined temperature;
   a means for introducing the wood product into said vessel;
   a means for covering the introduced wood product with said heated bioesters for a predetermined time; and
   draining said bioesters from said heat treated wood product;
   wherein said bioesters act as a heating medium and substantially none of said bioesters remain in said drained heat treated wood product.

19. The apparatus of claim 18, further comprising a storage tank for storing said bioesters, a means for retrieving said stored bioesters from said tank and a furnace for heating said retrieved bioesters to said predetermined temperature and a means for feeding said heated bioester into said vessel.

20. The apparatus of claim 19, wherein said feeding means comprises a network of pipes between said furnace and said vessel, said network of pipes operationally connected to a computer for feeding said heated bioesters from said furnace into said vessel when said predetermined temperature has been reached.

21. The apparatus of claim 19, further comprising a means for returning said heated bioesters from said vessel to said storage tank following said predetermined period of time.

22. A process for the heat treatment of a wood product, the process comprising:
   placing the wood product in a vessel;
   heating a treatment product having a kinematic viscosity of less than 20 cSt at 40° C. to a predetermined temperature;

introducing said treatment product into said vessel until the wood product is covered with said treatment product;
removing the treated wood product from said vessel; and
recovering substantially all of said treatment product;
wherein said treatment product is bioesters, said bioesters act as a heating medium and further wherein said bioesters may be used as said heating medium a plurality of times without reprocessing.

\* \* \* \* \*